3,468,708
RECHARGEABLE DRY CELLS AND METHOD OF USING SAME
Stanley M. Davis, Somerville, N.J., John D. Voorhies, New Canaan, Conn., and Edward J. Schurdak, Somerville, N.J., assignors to American Cyanamid Company, Stamford, Conn., a corporation of Maine
Filed Feb. 23, 1966, Ser. No. 529,536
Int. Cl. H01m 27/26, 15/00
U.S. Cl. 136—6            5 Claims

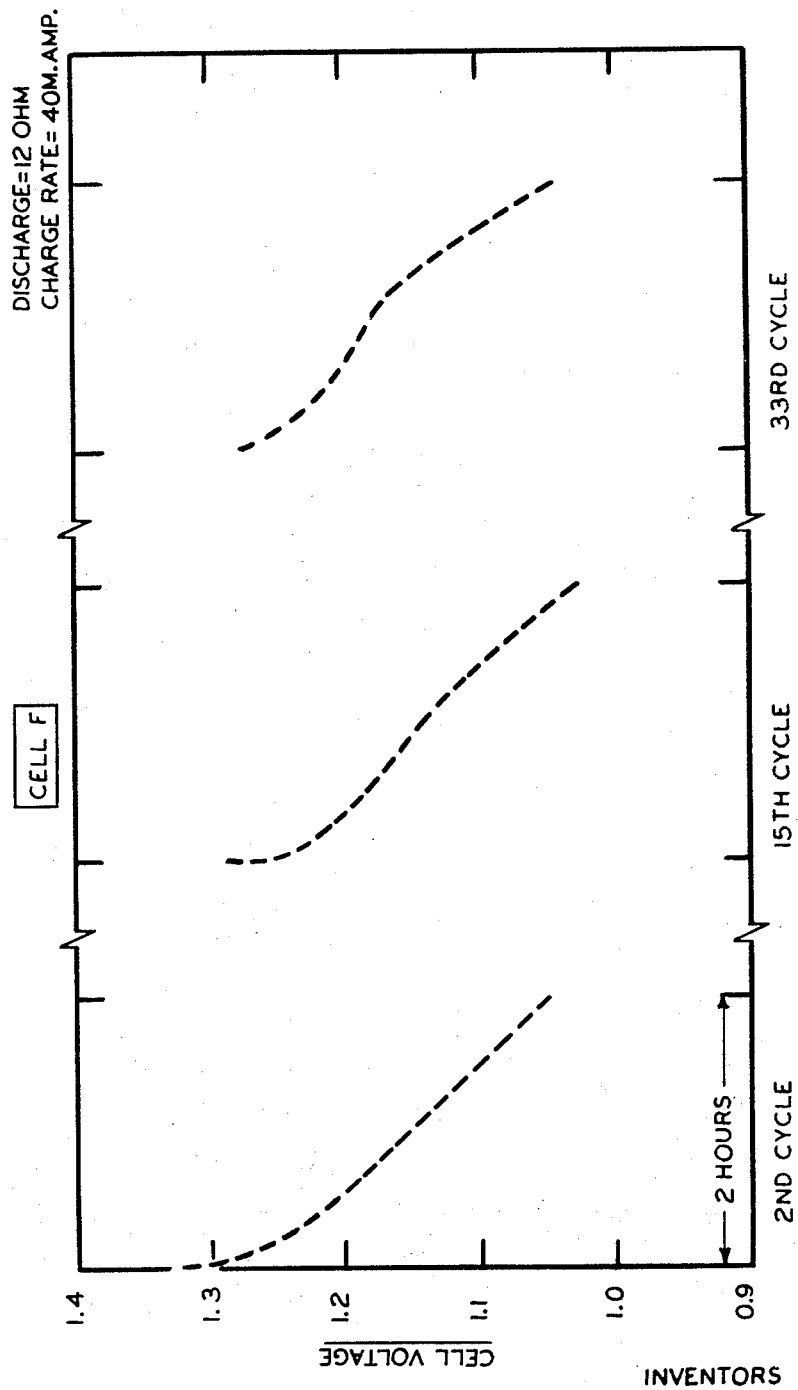

ABSTRACT OF THE DISCLOSURE

A secondary cell which is storage stable in the discharged state, and has excellent rechargeability, consists of a zinc anode, a microporous separator, and a cathode composition containing carbon black of at least 200 square meters per gram surface area, a relatively insoluble basic oxide selected from the group consisting of barium oxide and zinc oxide, an electrolyte containing water and zinc chloride or zinc bromide, and an organic depolarizer, which is biurea as the reduced state, for the discharged condition, and azobisformamide as the oxidized state, for the charged condition.

---

This invention relates to improved electric cell or battery compositions and the cells fabricated therewith and more particularly to improved cathodic mixes for secondary cells including secondary cells in "discharged condition," to the cells resulting therefrom, methods of using such cells, and particularly to cells using azodicarbonamide or biurea or mixtures thereof in said mix.

In the past, a variety of organic compounds have been proposed as organic depolarizers in the black cathodic mix for primary electric cells or batteries. However, these cells, normally functioning as "primary" cells are discarded when they become discharged through use. Low voltages may also limit the usefulness of such batteries.

Furthermore, these cells are not readily adaptable to efficient use as secondary cells, i.e., rechargeable cells, although in some instances they may be reactivated a few times by the popular-type commercially available electric cell "recharger." However, the primary dry cells normally available on the market generally cannot be recharged efficiently, particularly if discharged deeply. Attempts have been made to prepare practical secondary type dry cells with organic depolarizers and although such cells would be highly desirable, they have not to the present proven to be satisfactory.

It now has been discovered that a useful secondary cell can be made by using azodicarbonamide as the organic depolarizer in the cathodic mix. For best results, this cell requires a zinc anode. More particularly, by using a combination of high surface area, high electrolyte retention carbon black, selected electrolyte salts and specific types of separator, the resulting cells show superior performance characteristics in secondary cell application through repeated charge-discharge cycles.

The advantages of these zinc anode cells include (a) little or no delay time on discharge, a deficiency encountered, for instance, with magnesium anode cells; (b) no corrosive effects of the electrolyte on the anode with accompanying heating, gassing and loss of water; (c) less cost of the anode and/or greater availability.

It is an additional advantage of the cathodic mix with azodicarbonamide and the corresponding zinc anode cells that they are surprisingly useful as secondary cells, that is, they may be repeatedly discharged, recharged and discharged, giving satisfactory performance even after a large number of such charge and discharge cycles.

In general, the zinc anode cells of the invention with azodicarbonamide as the organic depolarizer have desirably discharge characteristics under various drain conditions including high rate and low rate discharge such as through a 4-ohm or a 150-ohm resistance and in both continuous and intermittent use.

Among the advantages to be mentioned are:
(1) Long life to voltages of 0.8 volt or lower.
(2) Flat discharge curve over an extended period, that is, good voltage regulation.
(3) Large energy per cell to a cut-off voltage of 0.8 volt, or lower.
(4) Adequate initial voltage and average voltage for practical applications.
(5) High efficiency, i.e., actual v. theoretical ampere-minutes output.
(6) Highly satisfactory performance when operated as a secondary cell through numerous charge-discharge cycles.

Additionally, and as another feature and embodiment of the invention, it has been discovered that highly efficient and superior secondary electric cells with zinc anodes result when biurea is used as an organic depolarizer precursor in the cathodic mix of the zinc anode cell, producing a cell in an inactive or discharged state, which is then converted to a charged cell by subjecting it to the action of an electric current shortly before the time at which power is needed. Such cells in a partially or wholly discharged state having biurea present are stable on storage and, of particular importance, may be retained in this discharged state for extended periods without adverse effects.

For activation, it is only necessary to charge the cell by passing a direct electric current through it in the proper direction.

Although it is believed the biurea in the cathodic mix may be converted upon charging at least in part to azodicarbonamide, the exact mechanism of chemical action, or chemical effect of the charging electric current, is not completely understood. Thus, this feature of the invention is to be limited in no way by any explanation or theory of the action of the electric current to produce an active depolarizer by action on the biurea in the cathodic mix.

In preparing the cells of the invention, the usual structures are used including: a zinc can or anode; a carbon collector; a cathodic mix comprising carbon, an aqueous electrolyte and a depolarizer; and a separator. Conventional procedures may be applied as to the carbon collector, zinc can or anode, seal, and the like. However, to achieve the most satisfactory performance, it has been found that the use in the cathodic mix of a carbon with high surface area and high electrolyte retention is preferred. In addition, certain types of electrolyte or electrolyte combinations give superior results; and in addition, particularly for use as a secondary cell, the type of separator influences the results.

Round cells, as usually used, give very good results, and flat cells, rectangular cells, and cells of other sizes and shapes are also satisfactory. Many such sizes and shapes are known to the prior art.

Thus, the usual types of carbon may be used, such as acetylene black. However, for best results, a high surface area carbon black with a surface area above 200 square meters per gram should be used, such as the blacks sold as Columbian HR–1670 or 1690 from the Columbian Carbon Company. It is also desirable that the carbon have high electrolyte retention characteristics in that large amounts of aqueous electrolyte may be added with the mix still retaining the required consistency for conventional "dry cell" construction.

The usual electrolyte salts, such as are compatible with the zinc anode, may be used including zinc, ammonium, manganous or magnesium salts as their chlorides or bromides or combinations thereof. Particularly, in cells which are used as secondary cells, it is desirable, however, to use a high zinc ion content with an ammonium salt. For best results, the electrolyte should consist of $ZnCl_2$ and $NH_4Cl$, or $ZnCl_2$ and $MnCl_2$, in varying combinations.

Satisfactory results are obtained using conventional type separators, such as kraft paper; kraft paper coated or impregnated with starch or other gel-like material such as carboxymethyl cellulose and/or cereal paste; vegetable parchment and the like. Superior results are achieved if a laminated cellophane separator is used. This separator may be described in somewhat more detail as a laminate of a film of small pore size (such as cellophane with an average pore diameter of 16 A.) with a cellulosic paper of high water retention properties which may have as an adhesive a material such as gum arabic. Other films such as porous nylon, polyester films, polyolefin films, polyacrylate films, polyvinylacetate films, polyvinylchloride films and other low porosity films, having pore sizes in the range of 5–40 Angstrom units are useful. The pores must permit ions to pass readily and inhibit diffusions of other materials.

Although it is not necessary for producing a useful rechargeable cell, the use of this laminated cellophane type separator results in considerable improvement in the cycling characteristics of the cell. Thus, using a regular porous kraft paper separator (or one which is impregnated with starch or carboxymethyl cellulose or composed of porous nylon, vegetable parchment, etc.), the cell with biurea as the depolarizer will normally give satisfactory performance through up to about 10 charge-discharge cycles. Using the cellophane laminate separator, the cell is normally satisfactory through up to 40 or more cycles. Thus, although not actually necessary, the cellophane laminate type separator is definitely preferred for superior performance in these cells.

In addition, and particularly when biurea is used, it is usually preferable to add a small percentage of zinc oxide to the cathodic mix. This protects the zinc anode by overcoming the effects of the presence of acid which is liberated during the charging part of the cycle when biurea is present. Any basic material which is insoluble in the electrolyte may be similarly used, for instance, barium oxide.

The secondary cells of this invention show especially good properties in that they maintain satisfactory discharge characteristics after repeated charge and discharge cycles. For testing purposes, these secondary cells are normally discharged at a high rate through a 12-ohm resistance for 2 hours; they are then subjected to a direct electric current for charging purposes and are then again discharged. On each discharge, the cell discharge characteristics are noted.

The examples presented hereinbelow are presented as illustrative embodiments only and it is in no way intended to limit the invention thereto.

EXAMPLE 1

Dry cells containing azodicarbonamide as the depolarizer are prepared by the following general procedure:

The selected depolarizer is dry mixed thoroughly with the carbon black and then the aqueous electrolyte is added. The system is then thoroughly mixed until the electrolyte is taken up by the dry mixture. The resulting uniform mixture is called the cathode mix.

An "AA" size zinc can is prepared by lining the inner surface with a low resistance separator so that about ¼ inch of separator protrudes from the edge of the can. The cathode mix is added in small portions and tamped down firmly with a glass rod. After filling the cell, a carbon rod with a brass cap (the "collector") is inserted concentrically into the mix, the protruding is folded over to enclose the mix, a paper washer is placed over the top of the enclosed mix and a top seal is made with a sealant such as a high melting wax, an epoxy resin, or the like.

Testing procedure

Cells were tested by discharging them either continuously or intermittently through a known resistance until the closed circuit voltage dropped below a certain predetermined figure; or designated periods of use and then rechargings were run, to a minimal voltage on such cycle. The voltage measurements were made with a DC voltmeter, Model C, from Sensitive Research Instrument Corp., New Rochelle, N.Y.

Using the procedure described above, cells A, B, C, and D were prepared and tested as follows using in each case a zinc anode and the designated separator and cathode mixture. A laminated cellophane separator was used unless otherwise designated.

Cell A:
  Azodicarbonamide _____ g__ 3.0
  Carbon black (HR 1670) _____ g__ 0.8
  Electrolyte (35% $ZnCl_2$; 20% $NH_4Cl$) __ml__ 2.8
Cell B:
  Azodicarbonamide _____ g__ 3.0
  Carbon black (HR 1670) _____ g__ 0.8
  Electrolyte (17% $ZnCl_2$; 27% $NH_4Cl$) __ml__ 2.8
Cell C:
  Azodicarbonamide _____ g__ 1.0
  Carbon black (HR 1670) _____ g__ 1.3
  Electrolyte (17% $ZnCl_2$; 27% $NH_4Cl$) __ml__ 2.8
Cell D:
  Similar to cell A above except using a starch-kraft paper separator.

These cells were then repeatedly discharged and charged. There is reported for each cell the number of complete charge-discharge cycles before the voltage during the discharge phase of a cycle falls below a certain set voltage. This lower limit is generally selected as 0.9 volt.

Results

Cell A was alternatively discharged through a 12-ohm resistance for 2 hours; and charged with 40 milliampere current for 4.5 hours. Eghteen complete cycles had been completed before discharge voltage fell below 0.9 volt.

Cell B was subjected to the same program as for cell A. Eighteen complete cycles were completed before the discharge voltage fell below 1.0 volt.

Cell C had a discharge period of 5 hours through a 25-ohm resistance and a charge period of 12 hours with 20 milliamperes. Twenty-one cycles were completed before the discharge voltage dropped below 0.9 volt, and the overall efficiency was 97%.

Cell D had original discharge characteristics which were the same as those of cell A. However, this cell had only limited cycling properties. On the third discharge, the voltage dropped below 0.8 volt during the 2 hour cycle.

EXAMPLE 2

Dry cells having biurea in the cathode mixture are prepared as described above, in Example 1.

The biurea, and zinc oxide if used, are dry mixed with the carbon black and then the aqueous electrolyte is added. The system is then thoroughly mixed until the electrolyte is taken up by the dry mixture.

Using this mixture, cells were prepared as described in Example 1 above.

Testing procedure

The cell is first activated by subjecting it to a direct current. The charged cell may then be tested as a primary cell by discharging through a known resistance (as through 150 ohms, slow drain); or it may be tested as a secondary or rechargeable cell by repeatedly charging and discharging until the voltage falls to a predetermined figure during a discharge part of a cycle.

Using the procedure described above, cells were prepared using cellophane laminate separators and tested as follows:

Cell E:
  Biurea _____ g__ 2.0
  Carbon black (HR 1670) _____ g__ 1.0
  Electrolyte (35% $ZnCl_2$; 20% $NH_4Cl$) ___ml__ 3.0

Cell F:
  Biurea _____ g__ 1.6
  Zinc Oxide _____ g__ 0.6
  Carbon black (HR 1690) _____ g__ 0.8
  Electrolyte (35% $ZnCl_2$; 20% $NH_4Cl$; 0.3% $HgCl_2$) _____ml__ 2.5

Cell G:
  Biurea _____ g__ 2.0
  Carbon black (HR 1670) _____ g__ 1.0
  Zinc oxide _____ g__ 0.75
  Electrolyte (35%) $ZnCl_2$; 20% $NH_4Cl$; 0.3% $HgCl_2$) _____ml__ 2.4

Cell H (same as cell G except for electrolyte):
  Electrolyte (7% $ZnCl_2$; 27% $NH_4Cl$; 0.3% $HgCl_2$) _____ml__ 2.4

Cell I:
  Biurea _____ g__ 1.0
  Azodicarbonamide _____ g__ 1.0
  Carbon black (HR 1670) _____ g__ 1.0
  Electrolyte (35% $ZnCl_2$; 20% $NH_4Cl$; 0.3% $HgCl_2$) _____ml__ 2.4

Cell J (same as cell I except for electrolyte):
  Electrolyte (17% $ZnCl_2$; 27% $NH_4Cl$; 0.3% $HgCl_2$) _____ml__ 2.4

In the above-described cells mercuric chloride is included in small amounts; this amalgamates the zinc surface, giving an equipotential surface. This is a conventional usage.

Results

Cell E.—This cell was charged using a current of 5.2 milliamperes for 88 hours (0.46 ampere-hour or approximately ½ full charge). On discharge through a 150-ohm resistance, the time to 0.8 volt was 45 hours. (83% efficiency.)

Cell F.—This cell was originally charged using a current of 40 milliamperes for 11 hours. It was then discharged for 2 hours through a 12-ohm resistance. Charge-discharge cycles were repeated using a 5-hour 40-milliampere charge followed by a 2 hour discharge through a 12-ohm resistance, until the discharge through the 2 hour discharge cycle did not consistently remain above 0.9 volt.

The discharge characteristics are illustrated in the curves of the accompanying figure.

Discharge voltages are shown as a function of time. Only illustrative cycles are shown. This cell completed 40 cycles before the voltage dropped consistently below 0.9 volt on the discharge cycle.

Cells G through J.—These cells, subjected to charge-recharge cycles as described in the paragraph on cell F above, showed similar results.

We claim:
1. A dry cell capable of withstanding deep discharge especially adapted for prolonged shelf life and charging before use, comprising prior to initial use, in combination: a zinc anode, a separator and a cathode composition, comprising a mixture of (1) carbon black having a surface area of at least 200 square meters per gram, (2) a relatively insoluble basic oxide selected from the group consisting of barium oxide and zinc oxide, (3) an electrolyte containing water and a soluble zinc salt selected from the group consisting of zinc chloride and zinc bromide and (4) biurea.

2. The cell of claim 1 wherein the separator is a laminate.

3. A method of activating a dry cell capable of withstanding deep discharge having a zinc anode, a separator, a cathode composition comprising (1) carbon black having a surface area of at least 200 square meters per gram, (2) a relatively insoluble basic oxide selected from the group consisting of barium oxide and zinc oxide, (3) a zinc salt electrolyte containing water and a soluble zinc salt selected from the group consisting of zinc chloride and zinc bromide and (4) biurea which comprises subjecting the cell to an electric current to convert at least part of the biurea to azodicarbonamide, whereby the cell becomes activated and acquires a charged condition.

4. A method of storing energy for release at a desired time which comprises charging a dry cell capable of withstanding deep discharge consisting of a zinc anode, a microporous separator having pore size in the range of about 5 to 40 angstrom units, which permits the passage of ions, and inhibits the diffusion of other materials, a cathode composition comprising (1) carbon black having a surface area of at least 200 square meters per gram (2) a zinc salt electrolyte containing water and a soluble zinc salt selected from the group consisting of zinc chloride and zinc bromide, (3) a relatively insoluble basic oxide selected from the group consisting of barium oxide and zinc oxide and (4) a depolarizer precursor consisting essentially of biurea, storing said cell until shortly previous to the time of first use, charging said cell by passing a charging current therethrough to oxidize the biurea, at least in part, to azobisformamide, utilizing said cell as a source of energy by drawing an electric current therefrom, thereby reducing azobisformamide to biurea, and discharging said cell and subsequently, and repeatedly, charging and discharging said cell.

5. The method of claim 2 in which the zinc salt electrolyte comprises at least about 17% of a zinc salt selected from the group consisting of zinc chloride and zinc bromide.

References Cited

UNITED STATES PATENTS

| | | | |
|---|---|---|---|
| 1,597,165 | 8/1926 | Markiewicz et al. | |
| 3,040,114 | 6/1962 | Huber | 136—103 XR |
| 3,185,590 | 5/1965 | Mayer et al. | 136—6 |
| 3,260,621 | 7/1966 | Shaw et al. | 136—103 XR |
| 3,288,642 | 11/1966 | Kordesch | 136—6 XR |
| 3,332,802 | 7/1967 | Clune et al. | 136—6 XR |
| 2,836,644 | 5/1958 | Morehouse et al. | 136—137 |
| 3,152,017 | 10/1964 | Coleman et al. | 136—137 |

WINSTON A. DOUGLAS, Primary Examiner

D. L. WALTON, Assistant Examiner

U.S. Cl. X.R.

136—103, 137, 165